United States Patent [19]

Lockton

[11] Patent Number: 5,083,800
[45] Date of Patent: Jan. 28, 1992

[54] GAME OF SKILL OR CHANCE PLAYABLE BY SEVERAL PARTICIPANTS REMOTE FROM EACH OTHER IN CONJUNCTION WITH A COMMON EVENT

[75] Inventor: David B. Lockton, Atherton, Calif.

[73] Assignee: Interactive Network, Inc., Mountain View, Calif.

[21] Appl. No.: 535,309

[22] Filed: Jun. 7, 1990

Related U.S. Application Data

[63] Continuation of Ser. No. 365,050, Jun. 9, 1989, abandoned.

[51] Int. Cl.$^5$ .............................................. A63F 9/24
[52] U.S. Cl. ............................ 273/439; 273/DIG. 28; 273/434
[58] Field of Search ............... 273/85 G, 138 A, 1 E, 273/DIG. 28, 433, 434, 439; 364/410

[56] References Cited

U.S. PATENT DOCUMENTS

| | | | |
|---|---|---|---|
| 4,111,421 | 9/1978 | Mierzinski | 273/85 G |
| 4,247,106 | 1/1981 | Jeffers et al. | 273/85 G |
| 4,339,798 | 7/1982 | Hedges et al. | 273/138 A |
| 4,477,069 | 10/1984 | Crudgington, Jr. | 273/DIG. 28 |
| 4,514,342 | 9/1986 | Takashima | 273/85 CP |
| 4,572,509 | 2/1986 | Strick | 273/1 E |
| 4,652,998 | 3/1987 | Koza et al. | 273/138 A |
| 4,845,739 | 7/1989 | Katz | 379/92 |
| 4,848,771 | 7/1989 | Richardson | 273/237 |
| 4,926,255 | 5/1990 | Von Kohorn | 358/84 |

Primary Examiner—Edward M. Coven
Assistant Examiner—Jessica J. Harrison
Attorney, Agent, or Firm—Flehr, Hohbach, Test, Albritton & Herbert

[57] ABSTRACT

A game of skill or chance playable by several participants remote from each other in conjunction with a common event, such as a computer game, provides the basic format or template of the game on a floppy disk suitable for use with the remote users' personal computers. Then by connection to a mass communications one way channel, such as an FM SCA channel, variations in the game parameters and characteristics are broadcast at the same time to all of the individual remote players. These characteristics both initialize characteristics of the game and when the game is being played, provide updated playing parameters. A score can later be uploaded to the central station by, for example, telephone lines or any other convenient means.

6 Claims, 5 Drawing Sheets

GAME OF SKILL OR CHANCE PLAYABLE BY SEVERAL PARTICIPANTS REMOTE FROM EACH OTHER IN CONJUNCTION WITH A COMMON EVENT

This is a continuation of application Ser. No. 365,050 filed June 9, 1989, now abandoned.

The present invention is directed to a game of skill or chance playable by several participants remote from each other in conjunction with a common event. More specifically, such event might be a computer (or video) game as viewed by the participants on their personal display.

BACKGROUND OF THE INVENTION

Video or computer games for home use are well known where a game cartridge or floppy disk is utilized in conjunction with a personal computer or a specially designed game console (which itself is equivalent to a specialized personal computer). Extensions of this include the use of a telephone modem hooking the personal computer to a central computer and via a two-way telephone line to, for example, playing a game originated and controlled by the central computer. Alternatively, the entire game may be downloaded to the remote personal computer.

A typical example of the foregoing is, for example, in a casino where a viewer may watch an actual game of Keno or craps in his hotel room on a TV monitor and with wired communication to the central casino place bets and accomplish other necessary transactions. This is shown in Hedges U.S. Pat. No. 4,339,798.

Finally, U.S. Pat. No. 4,592,546 illustrates game consoles located in homes hooked to a common network where the viewers are watching live a, for example, football game. Here both lockout signals and other information is transmitted via an FM SCA channel to each participant and a final score based on the proficiency at guessing, for example, the type of play of the football game, is scored and uploaded via telephone line.

OBJECT AND SUMMARY OF THE INVENTION

It is a general object of the present invention to provide an improved game of skill or chance playable simultaneously by several participants remote from each other.

In accordance with the above object, there is provided a game of skill or chance playable by several participants remote from each other in conjunction with a common event comprising a computer game serving as a common event having a basic format and stored in binary form on a digital storage medium. A personal computer associated with each participant receives this storage medium. A one-way communications means is provided. A network terminal is connected to each personal computer for receiving data from the mass communications means and transferring such data to the personal computer. The mass communications means transfers this data to the network terminal in a form compatible with the format of the computer game for both initializing characteristics of the game and while the game is being played, for providing updated playing parameters.

DETAILED DESCRIPTION OF PREFERRED EMBODIMENT

Figure 1:
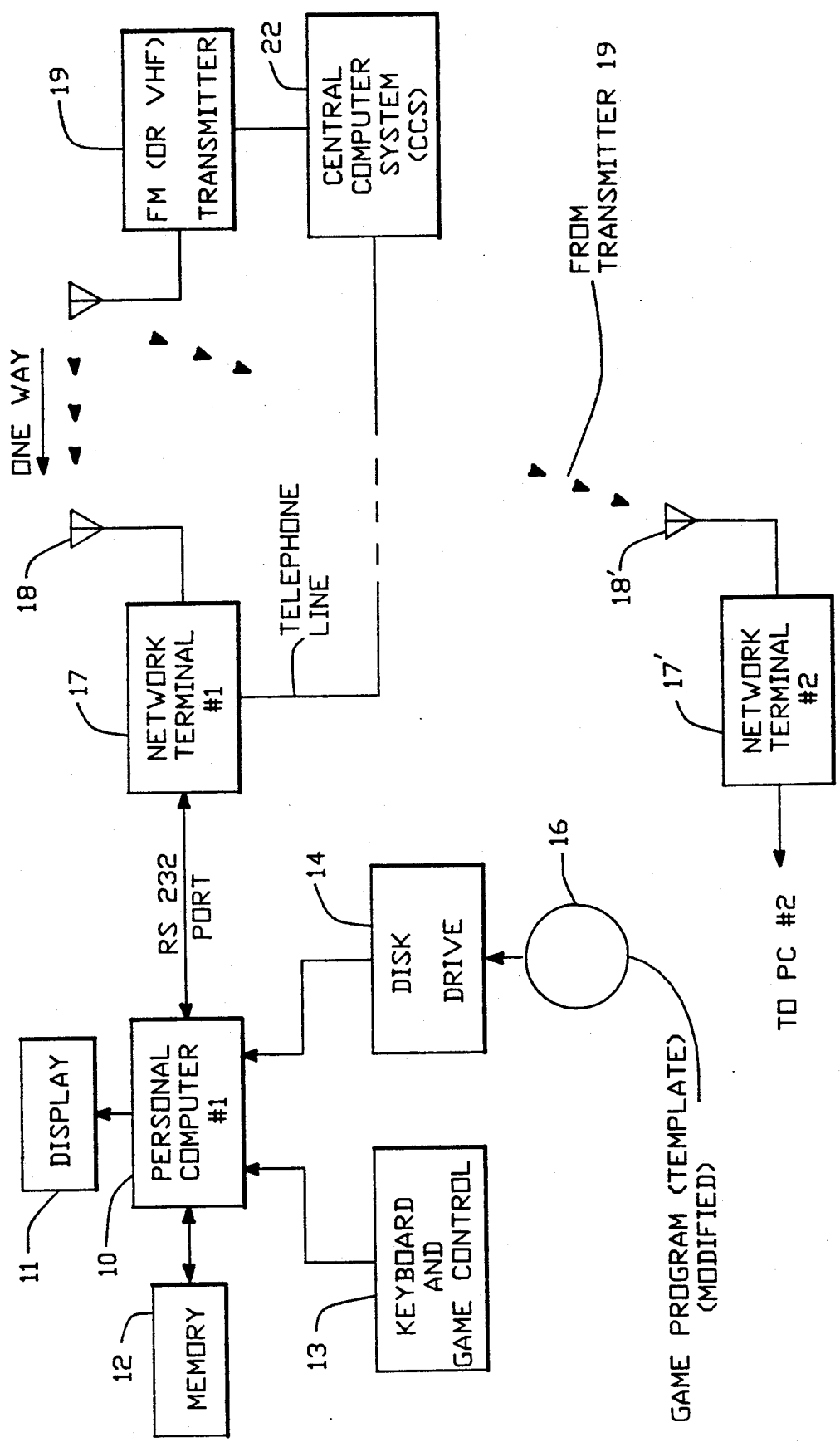
FIG. 1 is a block diagram of a game of skill or chance showing apparatus which would be associated with the player participants and its connection to a central computer system.

FIG. 1 illustrates a personal computer 10 and its associated peripherals utilized for playing the computer game of the present invention. As used here, "computer game" which normally uses a floppy disk storage medium is meant to encompass "video games" which use a read only memory (ROM) cartridge and a TV screen system.

Peripheral components of computer 10 include the display 11 (normally a cathode ray tube), memory 12, a keyboard and game control 13, and a disk drive 14 (perhaps of the floppy type) into which a floppy disk 16 may be inserted. Keyboard and control unit 13 may include typical video game controls such as either a joy stick or a yoke which simulates the steering wheel of a flight simulator. Connected to the RS 232 port of the personal computer 10 is a network terminal 17 having an antenna 18. Although a personal computer is illustrated, any type of central processing unit or specialized digital hardware may be used. Both personal computer 10 and network terminal 17 are, of course, at the same remote location. In another location will be the same set of equipment designated, for example, 17' for the network terminal #2 with an antenna 18', the network terminal 17' being connected to its associated personal computer (PC #2).

Network terminals 17 and 17' via the antennas 18 and 18' are coupled on a one way basis to, for example, an FM transmitter 19 via its antenna 21. Such FM transmitter might be the SCA channel of an FM station (see also the above '546 patent), a VHF, or VHF television antenna where the mass communications channels might be a Teletex channel or any other mass communications type system delivered over the air or by a cable or fiber optics system. Since it is mass communications and one way, this means the cost is completely insensitive to the number of users and is, of course, very low relative to each remote user. A further type of mass communications means might include a digital channel in digital data for "high definition television" (HDTV).

Controlling transmitter 19 is a central computer system (CCS) 22. This may be linked to each network terminal by a telephone line 23 when such connection is desired. However, it is contemplated that because of the cost of this link, it is only to be used for a very short time—for example, uploading a score or result as set out in the above '546 patent.

Lastly, as will be discussed below, the floppy disk 16 may be any other binary magnetic media such as tape, etc., or in fact even downloaded from a central system onto hard disks, etc. And typically it would be a video game program which is modified (or at least operable) with the overall game concept, as determined by Central Computer System 22.

Figure 2:
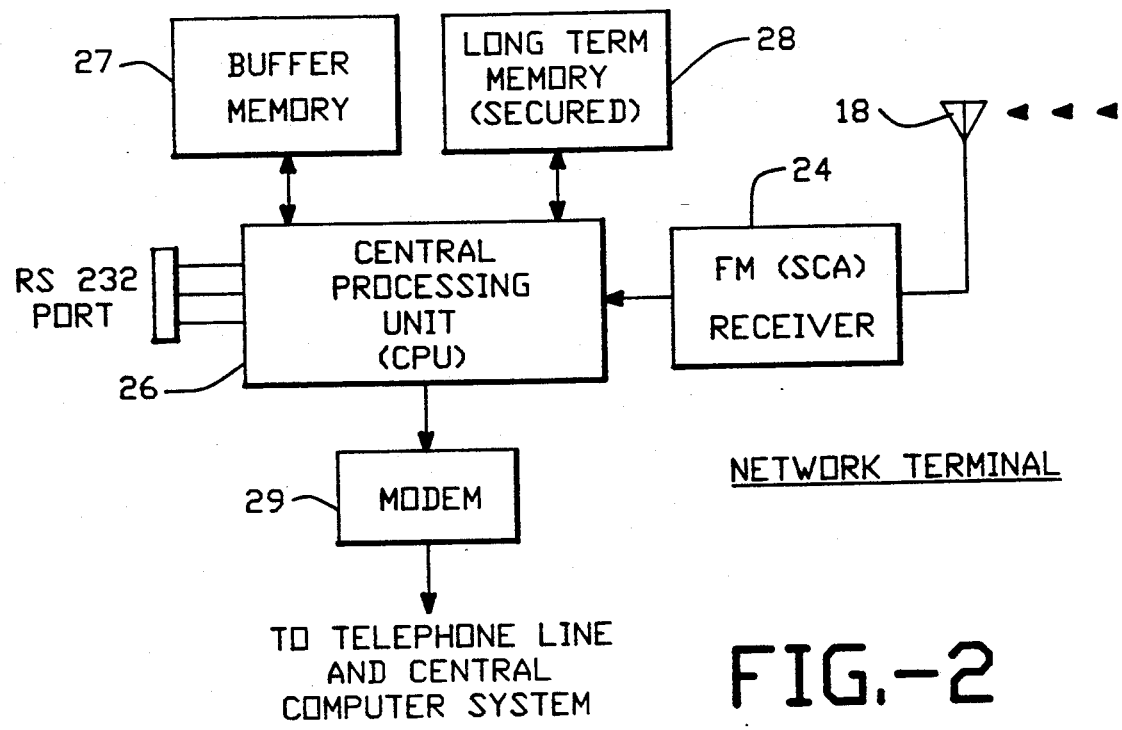
FIG. 2 is a more detailed block diagram of a portion of a network terminal portion of FIG. 1.

FIG. 2 illustrates the details of network terminal 17 which includes a FM receiver 24 for receiving, for example, the SCA signal on the FM channel and converting it into digital format for use in the associated central processing unit (CPU) 26. Such FM receiver is commercially available, for example, from Lotus Information Network Corporation with its system for transmitting stock market quotes. CPU 26 by its RS 232 port is connected to the personal computer 10. CPU 26 is also connected to a buffer memory 27, a long term memory 28 and a modem 29 which is for connection to telephone line 23. Memory 28 may also function as a secure memory for storing game scores.

Figure 3:
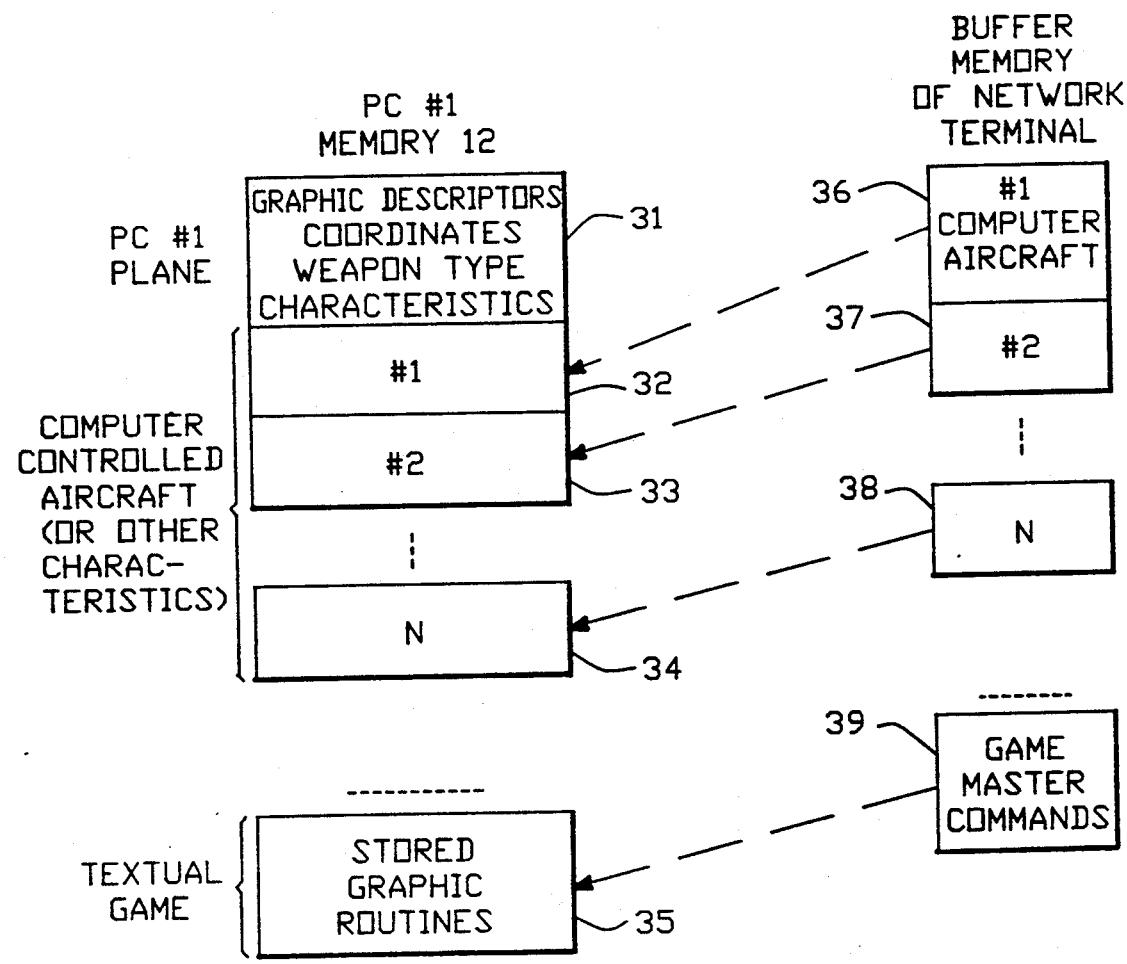
FIG. 3 illustrates a memory portion of FIG. 1.

FIG. 3 illustrates the memory contents of both the PC memory 12 along with the buffer memory 27 of network terminal 17 for two examples of the operation of the present invention.

But in general, for a standard computer game (unmodified by the present invention) the floppy disk 16 with a game program is inserted into the disk drive 14, as shown in FIG. 1, and the memory 12 would have various memory spaces as illustrated at 31 through 35, in which various formats and parameters of the game would be stored for implementation by the logic portion of the personal computer.

In such a standard video game, for example, such as "flight simulator" where the player of the game has one plane marked at memory location 31 as PC #1 plane and where there are other computer controlled aircraft marked #1, #2 . . . N at memory spaces 32, 33 and 34, a basic format of the game would be stored in this memory.

In general the game includes firing missiles at each other from both the player's plane and the computer controlled aircraft and setting up various obstacles.

Figure 4:
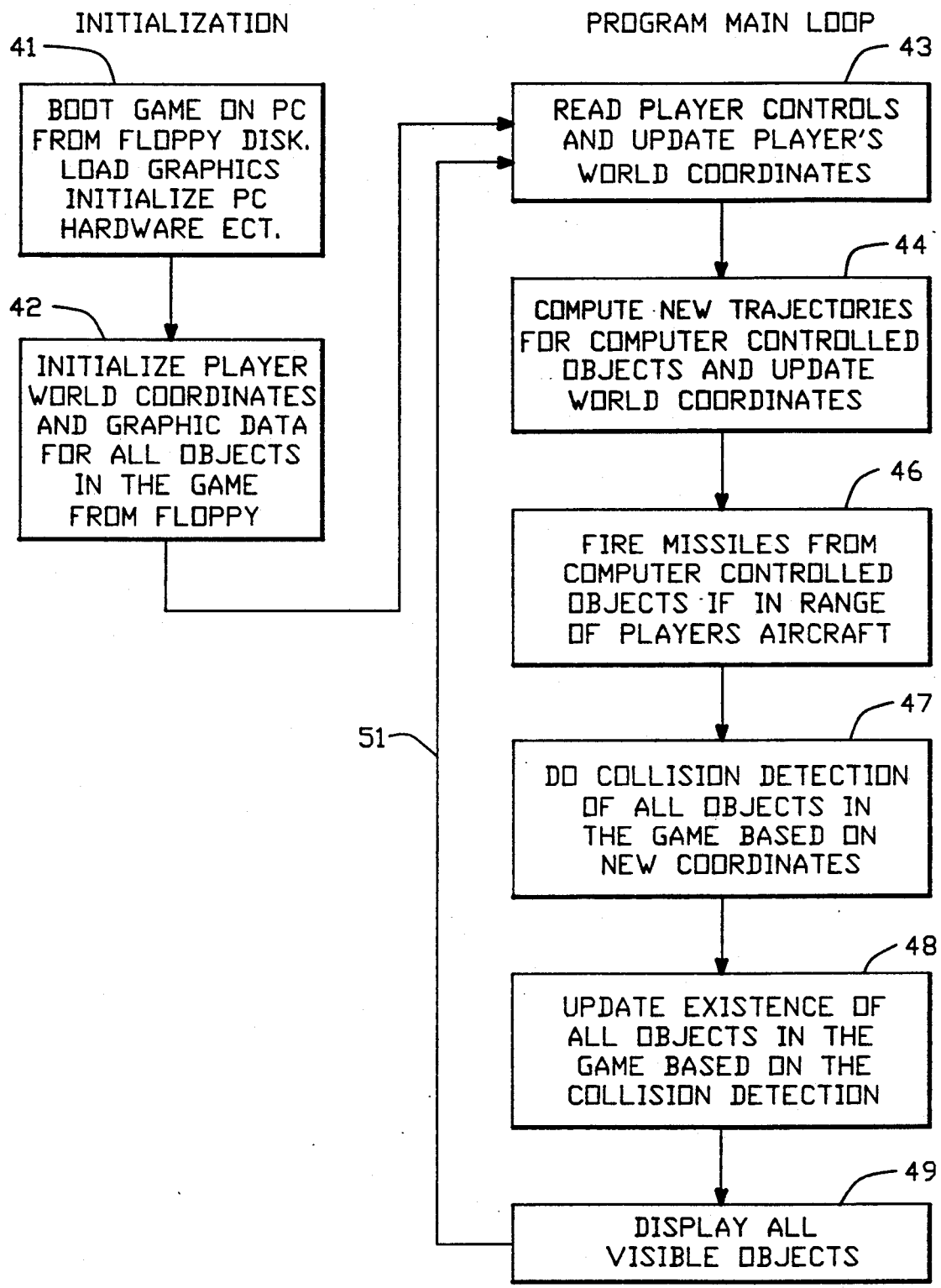
FIG. 4 is a flow chart of a typical prior art video game.

Before discussing the modification made to this basic game, how it would be played normally in the prior art on a personal computer or on a game console is shown by the flow chart of FIG. 4. In essence, this is the basic format of the game which, as will be discussed below, will be somewhat modified to accept external instructions from the Central Computer System 22 (see FIG. 1).

Referring now in detail to the prior art flow chart of FIG. 4, in step 41 a floppy disk 16 (unmodified, of course) is placed in the disk drive unit 14 and the game is "booted," meaning input into the memory of the computer and all graphics and hardware are initialized and data structures set up which are necessary to run the game. Then in step 42 the co-ordinates of the players' world are initialized, along with graphics data for all objects in the game from the floppy disk. Thus, for example, the player's plane might be initialized on the ground at the San Francisco Airport. Also, the computer controlled aircraft would be given their initial co-ordinates.

Next, in the program main loop starting at step 43, the game begins and the player's controls are read and the player's world co-ordinates updated. Particularly, the controls which are contained in keyboard and games and control unit 13 would be a flight simulator steering wheel or alternatively a joy stick or the use of a keyboard. The joy stick or flight simulator steering wheel would have a firing button on it. In step 44 the computer controlled objects or aircraft would have their trajectories computed based upon their artificial intelligence that lives on the program that's resident in the PC. And this then updates the world co-ordinates of all the computer controlled objects based upon those trajectories. This artificial intelligence is part of the overall operational program or format of the game which would be stored in the PC memory 12. And it is not of course, directly indicated in FIG. 3 which shows only the various operational units. However, the flow chart of course is a graphical representation of such program.

In step 46 missiles are fired from the computer controlled objects if it is in range of the players' aircraft (that is, PC #1 plane). Thus, the program essentially finds out if anybody has arranged to fire at the player; if so, then a shot is to be taken. At that point, all the objects in the world are updated and thus a collision detection of all objects in the game, based on these new co-ordinates, is done as shown in step 47. After the collision detection is done then the results of such collision detection is used to update the existence of all objects in the game, as in step 48. In other words, if objects collide, they usually don't exist any longer.

Then in step 49 all visible objects are displayed which in a flight simulator game means you have to determine what is visible from the cockpit of the player's plane at that moment. Then a loop 51 is made back to a starting point to get another set of controls. Then a score would generally be provided on the display screen.

Thus, the standard game ends when a point is reached where the aircraft has landed and exit is made or a crash is made or a collision has occurred, etc. Various types of collisions of course are with missiles shot by the computer controlled aircraft, a collision with a computer controlled aircraft itself or with the ground.

In the game of the present invention and referring to FIG. 3, the buffer memory 27 has been loaded from the Central Computer System 22 with information or data which is to be input into PC memory 12 to change various parameters and characteristics of the flight simulator game (or any other type of game of skill or chance). Briefly referring to the buffer memory 27, the data relevant to the computer controlled aircraft are now loaded with the relevant information (as in location 31) into memory units 36, 37 and 38. These directly correspond to PC units 32, 33 and 34. That is, the same information regarding graphic descriptors, co-ordinates, weapon type, characteristics, etc., rather than being supplied by a floppy disk of the player, are input externally. In any case, the utilization of this buffer memory 27 will now be explained in conjunction with the program flow chart of FIG. 5. In the initialization part of the program loop, in step 61, the game is booted from the floppy disk for initializing PC software, etc. This is similar to step 41 of FIG. 4. However, the format of the game on the floppy disk has now been modified to accommodate or be compatible with instructions and data from the Central Computer System 22. Specifically referring to FIG. 3 in the case of a flight simulator game, the memory spaces 32, 33, 34 are now basically blank templates of data structure for objects that are going to be displayed in the game. These of course, are the computer controlled aircraft. These memory locations are left blank until they receive the data from the Central Computer System through the network terminal 17. Thus, in a game such as the "flight simulator" video game, the modification of the standard game format would include opening up or providing the blank templates of memory for the computer controlled aircraft 32, 33 and 34. The general concept, however, applies to any other type of game of skill or chance where the basic intelligence for playing the game is contained in the floppy disk at the player's location but modifications are made such as blank templates to allow later input of external data from another source. Specifically, the Central Computer System 22.

Figure 5:
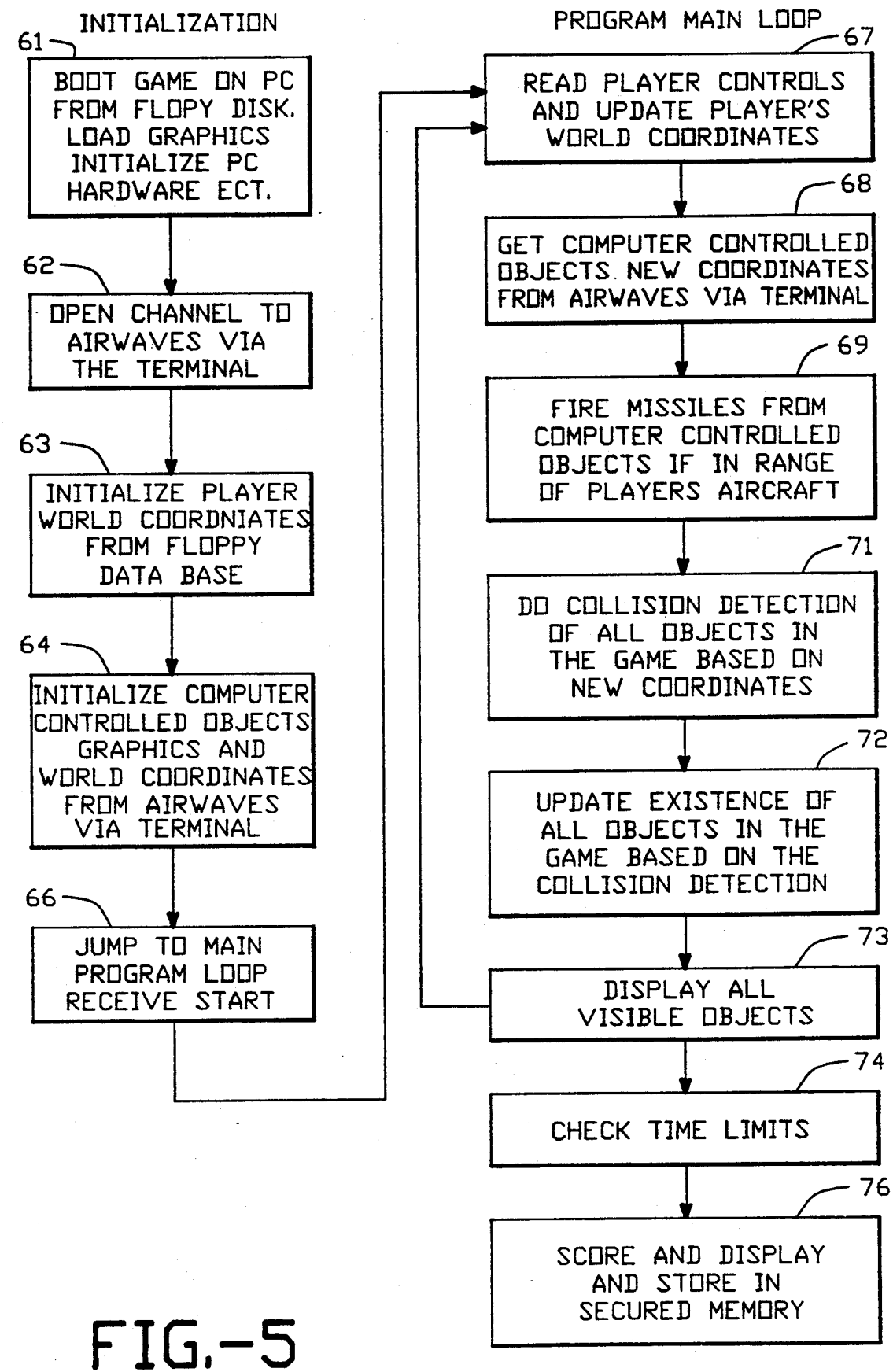
FIG. 5 is a flow chart of a game embodying the present invention.

Still referring to FIG. 5, in step 62 the personal computer 10 has an input channel via its RS 232 port (as illustrated in FIG. 1) opened to the network terminal 17 and the information being transmitted through the airwaves via antenna 18 from the Central Computer System 22. In step 63 the player's plane, PC #1 plane in memory location 31, is initialized from the floppy disk data base in the same manner as is done in step 42 (FIG. 4).

Figure 6:
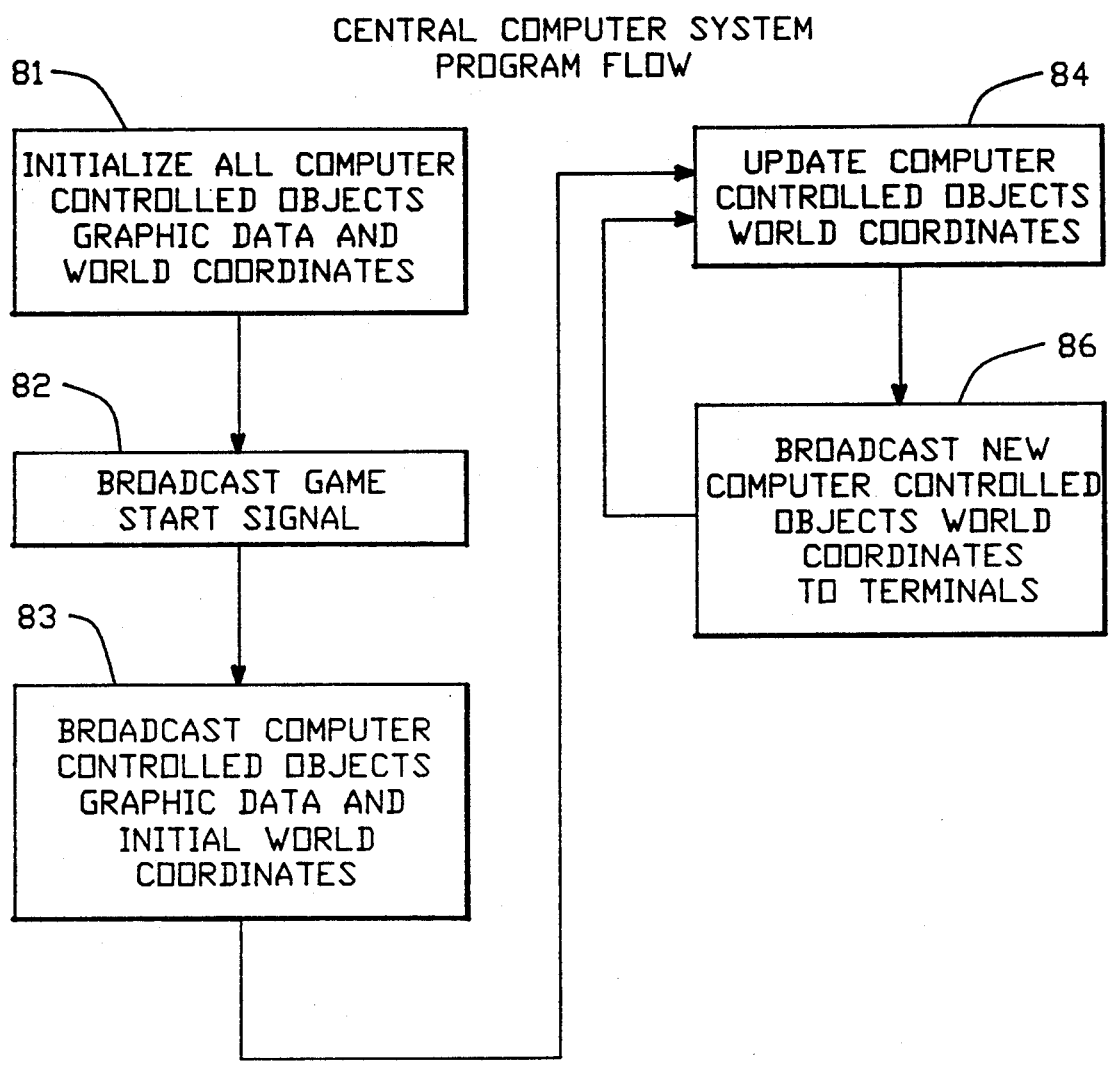
FIG. 6 is a flow chart embodying the present invention as it relates to the central computer system.

The significant departure occurs now in step 64 where from external information the computer controlled objects, graphics and world co-ordinates are initialized from data sent from the network terminal 17 and basically from the Central Computer System 22. FIG. 6 shows the Central Computer System program flow and in its initial step 81 all computer controlled objects are initialized. This data is received by the network terminal 17 since in step 62 its channel has been one to such information.

Still referring to FIG. 6, the game start signal in step 82 is broadcast and this is received in step 66 in the remote personal computer and network terminal unit. This causes a jump to the main program loop. Thus, in step 67 the game starts and the player controls are read and the players' position updated as in step 43 of the prior art FIG. 4. However, the next step 68, rather than using the internal information which was formerly in the video game, the computer controlled objects' new co-ordinates are gotten from the Central Computer Station and stored in the network terminal (see FIG. 3 and the buffer memory 27 at the spaces 36, 37, 38). Such information has been stored in the buffer memory by step 83 of FIG. 6 broadcasting the computer controlled objects' graphic data and initial world co-ordinates. Then while the game is being played, the updating occurs as in step 68 of FIG. 5 and steps 84 and 86 of FIG. 6.

Thereafter, referring to FIG. 5 in step 69 the firing the missiles is the same as in the normal game controlled by the basic format of the flight simulator game. Step 71 regarding collision detection is the same, step 72 updating the existence of objects in the game based on the collision detection, and then displaying of visual objects in 73 are performed by the local program intelligence that is the basic format of the game. These are the same as the prior art steps 46, 47, 48, and 49 as discussed in FIG. 4. The game continues by loop 75 until it terminates as discussed above.

In order to provide security for the game if a number of players throughout the country are playing at the same time, provision is made in step 74 (see FIG. 5) to check time limits to ensure that each player indeed was playing the game at a common time or simultaneously. Such a time limit checking is illustrated in the above mentioned game of skill U.S. Pat. No. 4,592,546.

Then lastly, in step 76 FIG. 5, the score is displayed and also stored in a secured memory for later uploading via telephone to the Central Computer System. This secured memory would be in the network terminal 17 in, for example, long term memory 28 as illustrated in FIG. 2.

A modification of the foregoing game is that in addition to transmitting information concerning computer controlled aircraft, other information such as ground based objects, the terrain of the ground, weather, etc., may be accomplished to change the characteristics of a game so that each time it is played it is new or unique to that group of players. Thus, the use of the one way mass communications means as, for example, by the FM SCA channel, allows significant parameters of a game to be changed and in fact make it appear to be a unique type of game. In fact, the program code can be transmitted which can change the basic strategy or scoring of the game.

FIG. 3 also shows the use of the invention in playing an adventure, fantasy role-playing textual game. Here the game is won by the intellectual skills of the player versus his eye/hand coordination. Thus, template 35 holds several stored graphic routines or patterns. These are selectively chosen by "game master" command stored in buffer unit 39 which have been received in real time on the mass communications means.

Thus, the game system can be designed so that each time the game is played in a contest among a group of players it would be in effect a unique game never before played. Existing video games such as PacMan, Lode Runner, F-14 Fighter or Super Mario Brothers could be controlled in the same manner.

All of the contestants who are playing the game as a common event at substantially the same time would in the manner shown in the above '546 game patent upload via the telephone line 23 their results for the group to be scored. With the use of the mass communications means to transmit the game variations and characteristics, new and interesting game variations are produced without the need of continuous and expensive two way connection to a central computer. In other words, with thousands of persons playing a video game at the same time competing against one another, to require each individual to be connected to a central computer by a two way dedicated line would obviously be prohibitively expensive and moreover impractical; and moreover, limit the number of simultaneous participants. Although a computer type game has been described, equivalent games of skill or chance may be used. Thus, an improved game of skill or chance simultaneously playable by several participants remote from each other in conjunction with a common event has been provided.

What is claimed:

1. A game of skill or chance playable simultaneously by several participants remote from each other in conjunction with a common event comprising:

computer game means for providing said common event having a basic format with playing parameters and stored in a binary data form on a digital storage medium;

personal computer means associated with each participant including means for receiving said binary data from said storage medium;

a one-way only mass communication means;

network terminal means connected to each personal computer means for receiving data related to said playing parameters from said one-way only mass communications means and transferring such data to said personal computer;

said mass communications means for transferring such data to said network terminal in a form compatible with said format of said computer game means for both initializing said game and while the game is being played, for providing updated playing parameters which affect the playing of said game.

2. A game as in claim 1 where said basic format of said game which is stored on said storage medium includes blank templates suitable for storing and receiving said data from said mass communications means.

3. A game as in claim 1, including means for receiving a start signal from said one way only mass communications means, so that all participants start the playing of said game at the same time.

4. A game as in claim 1 where each of said network terminals includes buffer memory means for temporarily storing said data from said one way only mass communications means for later transfer to a memory of said personal computer means.

5. A game as in claim 1 including means for scoring said game and for storing the results of said scoring in secured memory means.

6. A game as in claim 1 where said basic format includes a plurality of stored graphic routines for selective use in an adventure type computer game requiring player intelligence compared to player eye/hand coordination, and selected in accordance with said data from said mass communications means.

* * * * *